(12) United States Patent
Haller

(10) Patent No.: US 8,182,038 B2
(45) Date of Patent: May 22, 2012

(54) VEHICLE SEAT HAVING A DEVICE FOR CONTROLLING A PNEUMATIC SUSPENSION SYSTEM

(75) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 289 days.

(21) Appl. No.: 12/433,359

(22) Filed: Apr. 30, 2009

(65) Prior Publication Data

US 2009/0272871 A1 Nov. 5, 2009

(30) Foreign Application Priority Data

May 3, 2008 (DE) .......................... 10 2008 022 045

(51) Int. Cl.
*B60N 2/16* (2006.01)
(52) U.S. Cl. ..................... 297/344.16; 248/550; 248/631
(58) Field of Classification Search ............. 297/344.16; 248/550, 631
See application file for complete search history.

(56) References Cited

U.S. PATENT DOCUMENTS

| | | | |
|---|---|---|---|
| 2,973,968 A | 3/1961 | Behles | |
| 3,042,392 A | 7/1962 | Schmitz et al. | |
| 3,466,055 A | 9/1969 | Keijzer | |
| 3,552,763 A | 1/1971 | Yasin | |
| 3,762,769 A | 10/1973 | Poschl | |
| 3,938,770 A | 2/1976 | Turner et al. | |
| 3,966,223 A | 6/1976 | Carr | |
| 4,052,088 A | 10/1977 | Nicholls | |
| 4,159,105 A | 6/1979 | Vander Laan et al. | |
| 4,193,629 A | 3/1980 | Merkle | |
| 4,286,765 A | 9/1981 | Delgleize et al. | |
| 4,418,955 A | 12/1983 | Muncke et al. | |
| 4,451,079 A | 5/1984 | Takahashi | |
| 4,463,839 A | 8/1984 | Ashiba | |
| 4,469,010 A | 9/1984 | Skover, Jr. et al. | |
| 4,589,620 A | * 5/1986 | Sakamoto | ..................... 248/550 |
| 4,600,215 A | 7/1986 | Kuroki et al. | |
| 4,634,142 A | 1/1987 | Woods et al. | |
| 4,638,982 A | * 1/1987 | Misher et al. | ............. 248/550 X |
| 4,645,042 A | 2/1987 | Inoue et al. | |
| 4,645,169 A | 2/1987 | Mischer | |
| 4,684,100 A | 8/1987 | Grassl | |
| 4,700,971 A | 10/1987 | Doi et al. | |
| 4,726,604 A | 2/1988 | Asami et al. | |
| 4,729,539 A | 3/1988 | Nagata | |
| 4,729,580 A | 3/1988 | Buma et al. | |
| 4,733,847 A | 3/1988 | Grassl | |
| 4,822,094 A | 4/1989 | Oldfather et al. | |
| 4,852,863 A | 8/1989 | Breitenbacher et al. | |
| 4,941,641 A | 7/1990 | Granzow et al. | |

(Continued)

FOREIGN PATENT DOCUMENTS

DE 452315 11/1927

(Continued)

*Primary Examiner* — Rodney B White
(74) *Attorney, Agent, or Firm* — Lowe Graham Jones, PLLC

(57) ABSTRACT

A vehicle seat having a device for controlling a pneumatic suspension system, by means of which the vehicle seat is spring-mounted relative to a vehicle body part, including at least one directional-control valve which is pneumatically connected to the device for controlling the suspension system and which is arranged in the region of a seat part of the vehicle seat, the seat part being movable relative to a base frame and which is adjustable by a movement of the seat part relative to the base frame.

15 Claims, 3 Drawing Sheets

U.S. PATENT DOCUMENTS

| | | | |
|---|---|---|---|
| 4,946,145 A | 8/1990 | Kurabe | |
| 5,058,852 A | 10/1991 | Meier et al. | |
| 5,125,631 A | 6/1992 | Brodersen et al. | |
| 5,133,575 A | 7/1992 | Zantinge et al. | |
| 5,169,112 A * | 12/1992 | Boyles et al. | 248/550 |
| 5,169,129 A | 12/1992 | Hoffman | |
| 5,176,355 A | 1/1993 | Carter | |
| 5,199,690 A * | 4/1993 | Marshall | 248/631 X |
| 5,217,210 A | 6/1993 | Schützner | |
| 5,234,203 A | 8/1993 | Smith | |
| 5,255,935 A | 10/1993 | Imani | |
| 5,324,069 A | 6/1994 | Ogawa | |
| 5,413,316 A | 5/1995 | Easter | |
| 5,425,436 A | 6/1995 | Teramura et al. | |
| 5,428,533 A | 6/1995 | Ogawa | |
| 5,450,322 A | 9/1995 | Tanaka et al. | |
| 5,533,703 A | 7/1996 | Grassl et al. | |
| 5,536,059 A | 7/1996 | Amirouche | |
| 5,555,501 A | 9/1996 | Furihata et al. | |
| 5,558,398 A | 9/1996 | Santos | |
| 5,564,520 A | 10/1996 | Forsythe | |
| 5,570,866 A * | 11/1996 | Stephens | 248/631 |
| 5,582,385 A * | 12/1996 | Boyle et al. | 248/550 |
| 5,603,387 A | 2/1997 | Beard et al. | |
| 5,623,410 A | 4/1997 | Furihata et al. | |
| 5,735,509 A | 4/1998 | Gryp et al. | |
| 5,941,920 A | 8/1999 | Schubert | |
| 5,975,508 A * | 11/1999 | Beard | 248/550 X |
| 6,000,703 A | 12/1999 | Schubert et al. | |
| 6,029,764 A | 2/2000 | Schubert | |
| 6,067,491 A | 5/2000 | Takahashi | |
| 6,078,791 A | 6/2000 | Tuttle et al. | |
| 6,082,715 A | 7/2000 | Vandermolen | |
| 6,120,082 A * | 9/2000 | Vandermolen | 248/550 X |
| 6,202,972 B1 * | 3/2001 | Manavi | 248/631 X |
| 6,314,353 B1 | 11/2001 | Ohsaku et al. | |
| 6,371,456 B1 | 4/2002 | Ritchie et al. | |
| 6,490,930 B1 | 12/2002 | Ohkubo et al. | |
| 6,616,116 B1 | 9/2003 | Rochau et al. | |
| 6,886,650 B2 * | 5/2005 | Bremner | 248/550 |
| 7,152,839 B2 | 12/2006 | Mullinix et al. | |
| 7,694,946 B2 * | 4/2010 | Shoemaker et al. | 248/550 X |
| 7,712,836 B2 | 5/2010 | Deml | |
| 7,770,974 B2 * | 8/2010 | Ott et al. | 297/344.16 X |
| 2001/0044685 A1 | 11/2001 | Schubert | |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2006/0185434 A1 | 8/2006 | Bernhagen | |
| 2006/0278805 A1 * | 12/2006 | Haller | 248/550 X |
| 2007/0236071 A1 | 10/2007 | Fujita et al. | |
| 2008/0156602 A1 | 7/2008 | Hiemenz et al. | |
| 2008/0197684 A1 | 8/2008 | Ott et al. | |
| 2009/0026816 A1 | 1/2009 | Haller | |
| 2009/0134595 A1 | 5/2009 | Haller et al. | |
| 2009/0272871 A1 | 11/2009 | Haller | |
| 2010/0102493 A1 | 4/2010 | Deml et al. | |
| 2010/0117428 A1 | 5/2010 | Deml et al. | |
| 2010/0181708 A1 | 7/2010 | Kolb et al. | |
| 2010/0213345 A1 * | 8/2010 | Haller | 248/550 |

FOREIGN PATENT DOCUMENTS

| | | |
|---|---|---|
| DE | 2604809 | 8/1977 |
| DE | 8104855 | 8/1981 |
| DE | 220674 | 4/1985 |
| DE | 223835 | 6/1985 |
| DE | 3517503 | 11/1986 |
| DE | 4211628 | 10/1993 |
| DE | 4335199 | 5/1995 |
| DE | 19803750 | 8/1998 |
| DE | 19714576 | 10/1998 |
| DE | 19902224 | 4/2000 |
| DE | 19848821 | 5/2000 |
| DE | 20214583 | 1/2003 |
| DE | 10317134 | 6/2004 |
| DE | 10330198 | 2/2005 |
| DE | 102004054325 | 4/2006 |
| DE | 102005023090 | 11/2006 |
| DE | 102005043575 | 3/2007 |
| DE | 102005044214 | 3/2007 |
| DE | 112005000744 | 7/2008 |
| EP | 0089794 | 9/1983 |
| EP | 0563948 | 4/1993 |
| EP | 0938999 | 9/1999 |
| EP | 1050749 | 11/2000 |
| EP | 1188608 | 3/2002 |
| EP | 1352595 | 10/2003 |
| EP | 1464866 | 10/2004 |
| EP | 1484205 | 12/2004 |
| EP | 1657471 | 5/2006 |
| EP | 1693655 | 8/2006 |
| EP | 1844979 | 10/2007 |
| FR | 2879740 | 6/2006 |
| JP | 61075008 | 4/1986 |
| JP | 2133215 | 5/1990 |
| JP | 2197470 | 8/1990 |
| JP | 3200485 | 9/1991 |
| JP | 2004058695 | 2/2004 |
| JP | 2004185476 | 7/2004 |
| KR | 20020090377 | 12/2002 |
| WO | 8703256 | 6/1987 |
| WO | 8809270 | 12/1988 |
| WO | 8912766 | 12/1989 |
| WO | 0035708 | 6/2000 |
| WO | 0043952 | 7/2000 |
| WO | 0058125 | 10/2000 |
| WO | 02068229 | 9/2002 |
| WO | 2004057528 | 7/2004 |
| WO | 2005008578 | 1/2005 |
| WO | 2005022690 | 3/2005 |
| WO | 2005095153 | 10/2005 |
| WO | 2005102112 | 11/2005 |

* cited by examiner

VEHICLE SEAT HAVING A DEVICE FOR CONTROLLING A PNEUMATIC SUSPENSION SYSTEM

PRIORITY CLAIM

This application claims the benefit of German Application Serial No. 10 2008 022 045.0 filed May 3, 2008, contents of which are incorporated herein.

FIELD OF THE INVENTION

The invention relates to a pneumatic suspension system and, more specifically, to a control device configured to control a pneumatic suspension system of a vehicle seat spring-mounted to a vehicle body part.

BACKGROUND OF THE INVENTION

It is known to equip vehicle seats with a pneumatic suspension system which includes, among other things, at least one air spring and a control device which carries out an automatic level adjustment as a function of the weight loading a seat part of the vehicle seat. By way of example, when the seat is occupied by a driver of substantial weight, more air pressure is introduced into an air spring arranged within a base frame below the seat part. This typically produces the desired suspension effect with equal spring travel both in the upward and downward direction. By contrast, if the seat is occupied by a person of relatively insubstantial weight, air is discharged from the air spring within the suspension system in order to avoid too high an arrangement of the seat for this person and thus too short a spring travel in the upward direction.

Such suspension systems often cannot distinguish between the state of an occupied seat and the state of an unoccupied seat. As a result, the unoccupied seat state leads to the situation in which previous vehicle seats are set to a level as a function of their weight, which is primarily determined by the seat part, a backrest and parts of the base frame. Such a leveling of the vehicle seat has the result that, following previous seat occupancy, in the state of seat non-occupancy substantial air is unnecessarily discharged from the suspension system in order to obtain such a setting as a function of the intrinsic weight of the seat. This leads to an unnecessary waste of the air present in the suspension system and in particular in the air spring, which must be re-introduced, for example by means of a compressor.

Accordingly, there is a need for a control device configured to control a pneumatic suspension system of a vehicle seat spring-mounted to a vehicle body part in which the air discharged from the suspension system is controlled as a function of seat occupancy.

SUMMARY OF THE INVENTION

The present invention is directed to a vehicle seat having a control device for controlling a pneumatic suspension system. The preferred embodiment includes a vehicle seat that is spring-mounted relative to a vehicle body part the vehicle seat having a seat part being movable relative to a base frame. The present invention includes a control device that is pneumatically connected to at least one directional-control valve for controlling the suspension system and which is arranged in the region of the seat part of the vehicle seat. Due to such a direct interaction between the directional-control valve, which for example may be a 2/2-way valve and a 3/2-way valve, and the seat part of the vehicle seat, the present invention detects whether the seat part is or is not being loaded by weight due to the person sitting thereon on the basis of the movement of the seat part.

As a function of the detected seat occupancy, an air discharge line of the suspension system, which conveys discharged air, is closed or opened so that, in the event of the seat being unoccupied while the directional-control valve is in the closed state, the air quantity present during the seat occupancy remains within the suspension system. As a result, not only is no air discharged unnecessarily from the suspension system, but when the seat which is not occupied is occupied again, a desired level setting of the vehicle seat can take place more quickly, without having to wait a relatively long time for the desired air pressure to build up within the suspension system. The directional-control valve is preferably arranged in the air discharge line of the pneumatic suspension system in order to control a discharged air flow of the suspension system. In the preferred embodiment, the control has two states, namely, the closed state and the open state of the directional-control valve and thus of the air discharge line. Typically the closed state exists when the seat is not occupied, whereas the open state exists when the seat is being occupied.

The directional-control valve is in the open state after a downward movement of the seat part brought about as a result of seat occupancy, whereas it is in the closed state after an upward movement of the seat part brought about as a result of seat non-occupancy.

In a preferred embodiment, the directional-control valve has a retractable and extendable slide, the open end of which is below a lower edge of the seat part in the closed state of the directional-control valve and makes contact with a side face of the seat part in the open state of the directional-control valve. The slide is preferably configured to retract into and extend out of the directional-control valve by an upward or downward pivoting of the front section of the seat part so that a closed or an open state of the slide and thus of the air discharge line is obtained.

In a further embodiment, the vehicle seat has at least one spring between an underside of the seat part and the base frame arranged therebelow. The spring preferable has a spring force which can be dimensioned in such a way that the seat part with its intrinsic weight brings about no movement of the spring and therefore no movement of the slide of the directional-control valve. However, for example, if the seat part with its intrinsic weight is additionally occupied by a predefinable weight of a person, the spring is moved or compressed and thus the slide of the directional-control valve is displaced, which leads to an opening of the directional-control valve.

The directional-control valve is preferably connected via the air discharge line to at least one air spring for the suspension of the vehicle seat.

According to one alternative embodiment, at least one second directional-control valve for closing or opening the air discharge line may be arranged between the directional-control valve and the air spring. In yet an alternative embodiment, the air spring is connected to an air supply line and to a third directional-control valve.

BRIEF DESCRIPTION OF THE DRAWINGS

Advantages and expedient features can be found in the following description in conjunction with the drawing, in which.

DETAILED DESCRIPTION OF THE PREFERRED EMBODIMENT

Figure 1:
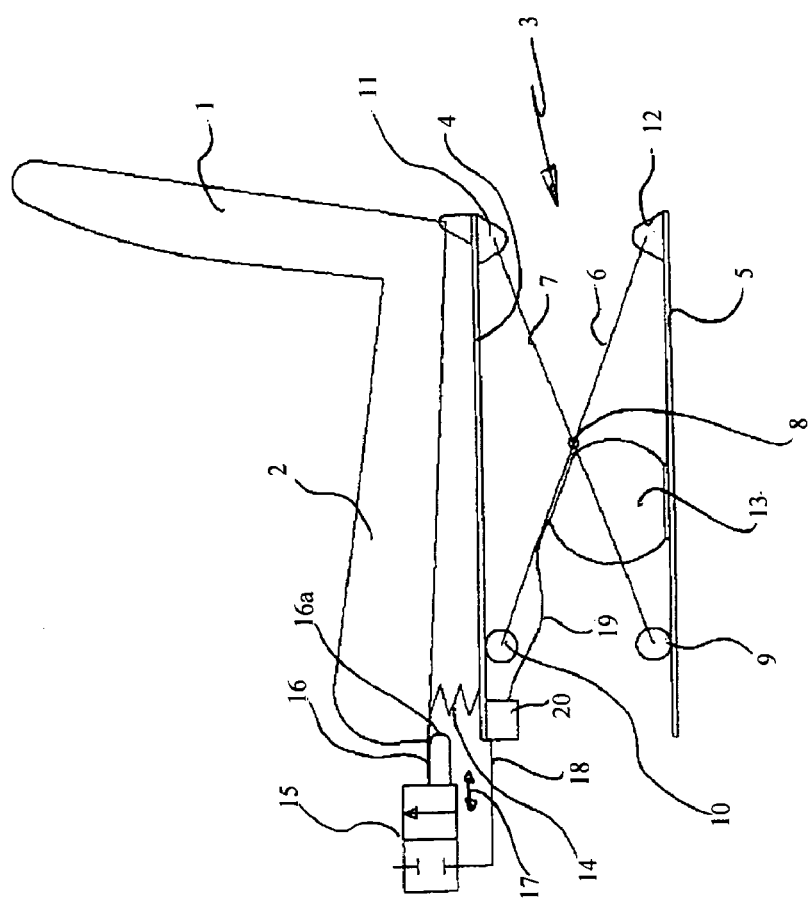
FIG. 1 shows, in a schematic side view, a vehicle seat according to one preferred embodiment of the invention in the unoccupied state.

FIG. 1 shows, in a schematic side view, a vehicle seat according to one preferred embodiment of the invention in the unoccupied state, i.e. without a seat part being occupied by a person. The vehicle seat comprises a backrest 1 and a seat part 2. Arranged below the seat part 2 is a base frame 3 which is essentially composed of an upper component 4, a lower component 5 and scissors arms 6, 7 which are connected to one another in a scissors-like manner and which are joined to one another in a pivoting manner at a pivot point 8.

The scissors frame comprising the scissors arms 6, 7 can be extended to a greater or lesser degree resulting in a height adjustment of the vehicle seat by displacing the scissors arms using rollers 9, 10 in the longitudinal direction of the vehicle seat. Preferably the ends of the scissors arms 6, 7 opposite the rollers 9, 10 have fixed bearings 11, 12 which are arranged on the upper component 4 and on the lower component 5, respectively.

In the preferred embodiment, at least one of the scissors arms 6 is connected to an air spring 13, the air pressure of which determines the height extension of the scissors arms 6, 7, as well as of the base frame 3 as a whole. The seat part 2 is moved upwards in its front region with respect to the upper component 4 by means of a schematically shown spring 14.

According to one embodiment of the invention, a 2/2-way valve 15 is provided having a slide 16 that can be retracted or extended in the direction of the double arrow 17. When the seat is not occupied, a front end 16*a* of the slide 16 is located below a lower edge of the seat part 2 and is thus extended. As explained below, alternative valves 15 may be used consistent with the scope of the present invention.

Figure 2:
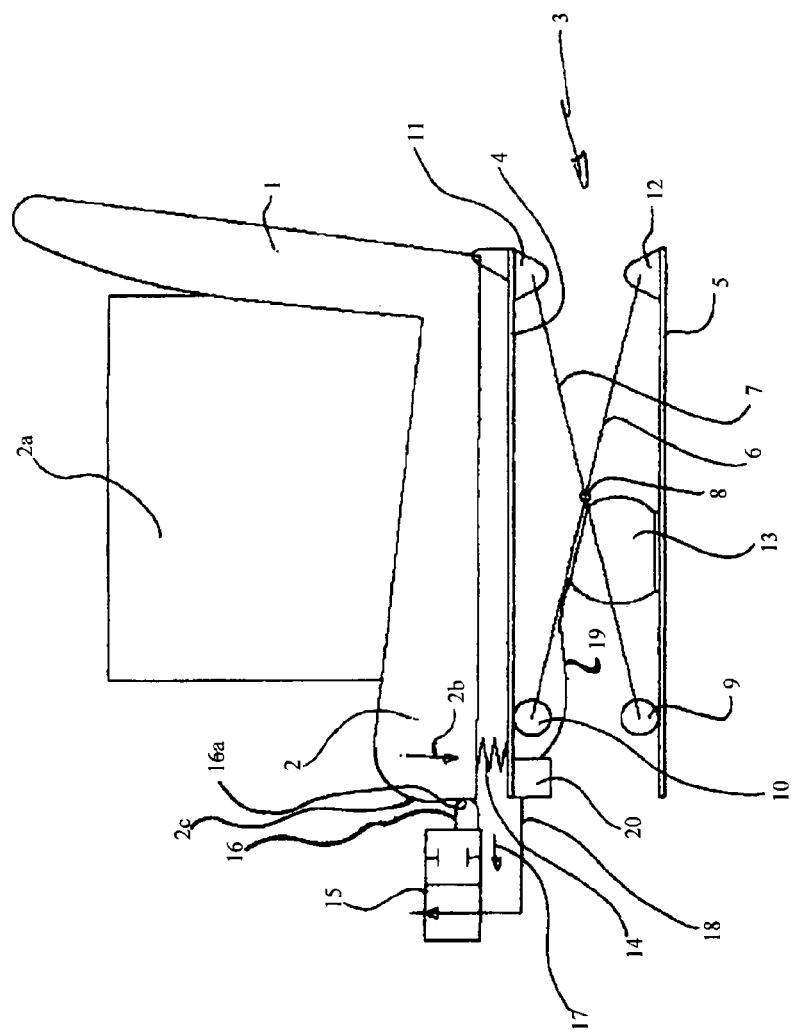
FIG. 2 shows, in a schematic side view, the vehicle seat of FIG. 1 in the state of seat occupancy.

FIG. 2 shows the vehicle seat of FIG. 1 in the state of seat occupancy. Components which are identical and which have the same function are provided with the same references. The vehicle seat shown in FIG. 2 is acted upon on the upper side by a weight load 2*a* which is intended to illustrate seat occupancy. As a result of the downward-acting weight force of the weight load 2*a*, the seat part 2 moves in the downward direction, as shown by an arrow 2*b*. As a result, the slide 16 is displaced out of its position below the seat part and retracts into the directional-control valve in the direction of the arrow 17. An air discharge line 18 coming from the device 20 for controlling the pneumatic suspension system is opened by the directional-control valve 15, allowing discharged air to escape via the air discharge line 18 and, in an alternative embodiment, via a further air discharge line 19 which is connected to the air spring 13.

By contrast, when the seat is not occupied, as in the state of the vehicle seat shown in FIG. 1, the air discharge line 18 is closed by the directional-control valve 15, thereby by restricting the discharge of air from the suspension system.

Figure 3:
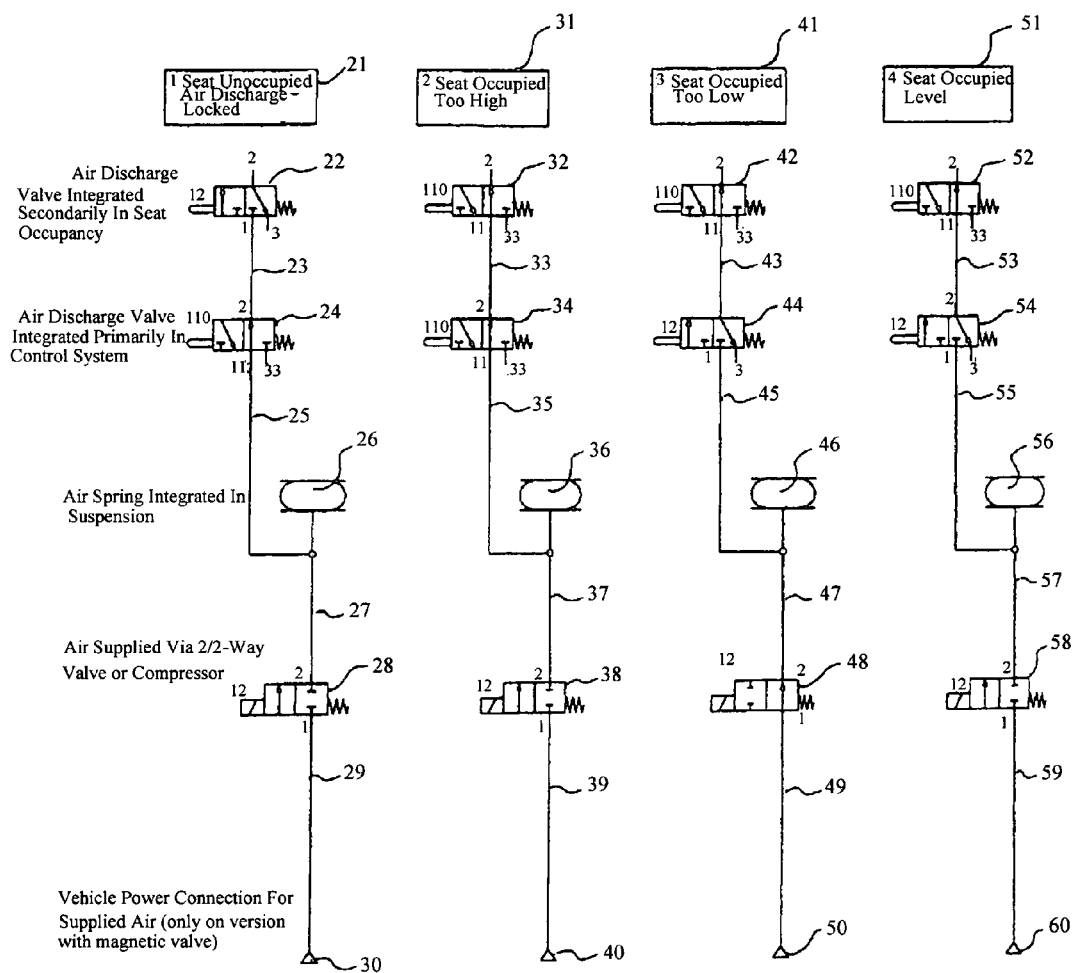
FIG. 3 shows, in an overview, different switching states of a device for controlling a pneumatic suspension system comprising a directional-control valve for the vehicle seat according to the invention.

Describing alternative embodiments, FIG. 3 shows different switching states of the directional-control valve and of the device for controlling the pneumatic suspension system comprising a plurality of directional-control valves.

When there is seat non-occupancy 21 which is detected through the slide 16, a directional-control valve 22, which is integrated as an air valve secondarily in seat occupancy detection, is closed. As a result, a discharged air flow within an air discharge line 23, 25 is not given the opportunity to escape from the suspension system.

A second directional-control valve 24 is arranged within the device for controlling the pneumatic suspension system. Shown next to this is an air spring 26 having a certain air pressure. Leading to the air spring 26 are air supply lines 27, 29 which can be closed or opened by means of a 2/2-way valve 28 as the third directional-control valve or by means of a compressor. Reference 30 denotes a vehicle power connection for supplied air.

As shown with reference to the state 21, a discharged air flow through the air discharge line 23 is blocked by the 3/2-way valve 22 being closed due to the position of an associated slide 26. As a result, no discharged air can escape, even though the second directional-control valve 24 is in the open state.

In a state 31 of seat occupancy following previous seat occupancy by a person heavier than the current person, the seat is set too high for the new person of lesser weight due to the increased air pressure which was necessary for setting the air spring and the suspension system due to the heavier person. Accordingly, it is necessary to allow a certain quantity of air to escape as discharged air via an air discharge line 33, 35. Since a directional-control valve 32 is automatically displaced into the open state as a result of the movement of the slide 16 during a downward movement of the seat part 2 caused by the seat occupancy, air can be discharged via the air discharge line 33, 35. A second directional-control valve 34 is also in the open state. A third directional-control valve 38 is in the closed state in order to block an air supply line 37, 39 and the coupling of a power connection 40 to an air spring 36.

A state 41 of seat occupancy which takes place after a previous seat occupancy in which a lighter person occupied the seat has the result that the seat is set too low for the person of greater weight now using the seat. Accordingly, a higher pressure is built up within the air spring 46, which takes place through the air supply lines 47, 49 by means of an open third directional-control valve 48 and a power connection 50. Air discharge lines 43, 53 are closed by means of a second directional-control valve 44. A first directional-control valve 42 is in the open state since in the event of seat occupancy the slide 16 is pushed into the directional-control valve 15 and thus the directional-control valve is placed in an open state.

In a switching state 51, seat occupancy after a previous leveling of the vehicle seat is shown. Once again, a directional-control valve 52 is in the open state due to the fact that the seat is occupied, with a second directional-control valve 54 being in the closed state. Air discharge lines are denoted by references 53, 55. An air spring 56 is also shut off from any air supply by means of a directional-control valve 58, air supply lines 57, 59 and also a power connection 60. As a result, no significant escape of discharged air from the suspension system takes place.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for use in a pneumatic suspension system of a vehicle seat that is spring-mounted relative to a vehicle body part, the vehicle seat having a seat part movable relative to a base frame and which is adjustable by a movement of the seat part relative to the base frame, comprising:
    a control device for controlling the pneumatic suspension system; and
    at least one directional-control valve, arranged in the region of the seat part of the vehicle seat, which is pneumatically connected to the control device,
    wherein the directional-control valve has an open state allowing discharged air flow and a closed state restricting discharged air flow,
    wherein the directional-control valve is in the open state after a downward movement of the seat part brought about as a result of seat occupancy, and
    wherein the directional-control valve comprises a retractable and extendable slide, the distal end of which makes contact with the seat part in the open state of the directional-control valve.

2. The apparatus according to claim 1, further comprising an air discharge line to control a discharged air flow of the suspension system, and wherein the at least one directional-control valve is arranged in the air discharge line.

3. The apparatus according to claim 2, wherein the directional-control valve is connected via the air discharge line to at least one air spring for the suspension of the vehicle seat.

4. The apparatus according to claim 3, further comprising a second directional-control valve for closing or opening the air discharge line arranged between the directional-control valve and the air spring.

5. The apparatus according to claim 4, further comprising a third directional-control valve, wherein the air spring is connected to an air supply line the third directional-control.

6. The apparatus according to claim 1, wherein
    the directional-control valve is in the closed state after an upward movement of the seat part brought about as a result of seat non-occupancy.

7. The apparatus according to claim 6, wherein the distal end of the retractable and extendable slide is below the seat part in the closed state of the directional-control valve.

8. The apparatus according to claim 1, further comprising at least one spring arranged between the seat part and the base frame.

9. A pneumatic suspension system for a vehicle seat supported by a base frame, comprising:
    a vehicle seat spring-mounted relative to the base frame and having a seat part, wherein the vehicle seat is adjustable by a movement of the seat part relative to the base frame;
    a control device for controlling the pneumatic suspension system; and
    at least one directional-control valve, arranged in the region of the seat part of the vehicle seat, which is pneumatically connected to the control device,
    wherein the directional-control valve has an open state allowing discharged air flow and a close state restricting discharged air flow, and
    wherein the directional-control valve is in the open state after a downward movement of the seat part brought about as a result of seat occupancy and the directional-control valve is in the closed state after an upward movement of the seat part brought about as a result of seat non-occupancy.

10. The apparatus according to claim 9, further comprising an air discharge line to control a discharged air flow of the suspension system, and wherein the at least one directional-control valve is arranged in the air discharge line.

11. The apparatus according to claim 10, wherein the directional-control valve is connected via the air discharge line to at least one air spring for the suspension of the vehicle seat.

12. The apparatus according to claim 11, further comprising a second directional-control valve for closing or opening the air discharge line arranged between the directional-control valve and the air spring.

13. The apparatus according to claim 12, further comprising a third directional-control valve, wherein the air spring is connected to an air supply line the third directional-control.

14. The apparatus according to claim 9, wherein the directional-control valve comprises a retractable and extendable slide, the distal end of which is below the seat part in the closed state of the directional-control valve and makes contact with the seat part in the open state of the directional-control valve.

15. The apparatus according to claim 9, further comprising at least one spring arranged between the seat part and the base frame.

* * * * *